United States Patent
Jeong et al.

(10) Patent No.: US 10,241,833 B2
(45) Date of Patent: Mar. 26, 2019

(54) METHOD AND COMPUTING DEVICE FOR INCREASING THROUGHPUTS OF SERVICES PROCESSED BY THREADS

(71) Applicant: TMAXSOFT. CO., LTD., Gyeonggi-do (KR)

(72) Inventors: Jun Soo Jeong, Gyeonggi-do (KR); Kyung Koo Yoon, Gyeonggi-do (KR); Moon Namkoong, Gyeonggi-do (KR)

(73) Assignee: TMAXSOFT. CO., LTD., Gyeonggi-Do (KR)

( * ) Notice: Subject to any disclaimer, the term of this patent is extended or adjusted under 35 U.S.C. 154(b) by 7 days.

(21) Appl. No.: 15/655,789

(22) Filed: Jul. 20, 2017

(65) Prior Publication Data

US 2019/0004856 A1   Jan. 3, 2019

(30) Foreign Application Priority Data

Jun. 29, 2017   (KR) ........................ 10-2017-0082846

(51) Int. Cl.
  *G06F 9/48*   (2006.01)
  *G06F 9/46*   (2006.01)
(52) U.S. Cl.
  CPC ............ *G06F 9/4887* (2013.01); *G06F 9/485* (2013.01)
(58) Field of Classification Search
  None
  See application file for complete search history.

(56) References Cited

U.S. PATENT DOCUMENTS

| | | | | |
|---|---|---|---|---|
| 4,564,901 A | * | 1/1986 | Tomlinson | G06F 9/547 709/201 |
| 9,298,504 B1 | * | 3/2016 | Vincent | G06F 9/5077 |
| 2015/0089261 A1 | * | 3/2015 | Segawa | G06F 1/3296 713/322 |
| 2017/0019478 A1 | * | 1/2017 | Russo | H04L 12/40 |

FOREIGN PATENT DOCUMENTS

| | | |
|---|---|---|
| KR | 10-0791437 B1 | 12/2007 |
| KR | 10-1076910 B1 | 10/2011 |

* cited by examiner

*Primary Examiner* — Eric C Wai
(74) *Attorney, Agent, or Firm* — Husch Blackwell LLP

(57) ABSTRACT

A method for increasing throughputs of multiple services processed by multiple threads on conditions that the multiple services include at least a first, a second, and a third services and the multiple threads include at least a first and a second thread including steps of: (a) if the first service being processed by the first thread calls the second service, supporting the second thread to process the second service; and (b) while the second service is being processed, supporting the first thread to process the third service; and (c) if the processing of the second service is completed, supporting (i) the first thread or (ii) one or more other threads except the first thread to resume a processing of an unprocessed part of the first service, by using a result value acquired by the processing of the second service.

14 Claims, 4 Drawing Sheets

METHOD AND COMPUTING DEVICE FOR INCREASING THROUGHPUTS OF SERVICES PROCESSED BY THREADS

CROSS REFERENCE TO RELATED APPLICATION

This application claims priority to and incorporates herein by reference all disclosure in Korean patent application no. 10-2017-0082846 filed Jun. 29, 2017.

FIELD OF THE INVENTION

The present invention relates to a method and a computing device for increasing throughputs of services processed by multiple threads, and more particularly, to the method and the computing device for, on conditions that the multiple services include at least a first, a second, and a third services and the multiple threads include at least a first and a second threads, if the first service being processed by the first thread calls the second service, supporting the second thread to process the second service; while the second service is being processed, supporting the first thread to process the third service; and if the processing of the second service is completed, supporting (i) the first thread or (ii) one or more other threads except the first thread to resume a processing of an unprocessed part of the first service, by using information on a result value acquired by the processing of the second service.

BACKGROUND OF THE INVENTION

A thread is a unit of flow executed in a process that processes information necessary to handle a request for a particular service. The thread processes the particular service in response to the request and shares information of the processed particular service with other threads.

A service, i.e., a caller service, processed by a thread may call another service, i.e., a callee service, to be processed by another thread, and there are two existing models: synchronous and asynchronous models.

According to the synchronous model, since the caller service must wait until the callee service is finished, the thread processing the caller service is at a suspending state until a processing of the callee service is finished, resulting in an inefficiency of the processing of the caller service.

Meanwhile, according to the asynchronous model, the thread may process an unprocessed part of the caller service while the callee service is being processed. However, as shown in FIG. 1, the thread cannot process other services, resulting in an inefficiency of the management of the services.

Accordingly, the present invention proposes a method and a computing device for increasing throughputs of services to be processed by threads.

SUMMARY OF THE INVENTION

It is an object of the present invention to solve all problems explained above.

It is another object of the present invention to increase throughputs of services processed by threads by a way of allowing a first thread which has processed a part of a caller service to process another service before a callee service being processed by a second thread is completed.

It is still another object of the present invention to allow the caller service to be continuously processed without being suspended, if the callee service processed by the second thread is completed while said another service is being processed by the first thread, by allowing another thread except the first thread to process an unprocessed part of the caller service.

In accordance with one embodiment of the present invention, a method for increasing throughputs of multiple services processed by multiple threads on conditions that the multiple services include at least a first, a second, and a third services and the multiple threads include at least a first and a second thread, including steps of: (a) a computing device, if the first service being processed by the first thread calls the second service, supporting the second thread to process the second service; and (b) the computing device, while the second service is being processed, supporting the first thread to process the third service; and (c) the computing device, if the processing of the second service is completed, supporting (i) the first thread or (ii) one or more other threads except the first thread to resume a processing of an unprocessed part of the first service, by using a result value acquired by the processing of the second service.

In accordance with another embodiment of the present invention, a computing device for increasing throughputs of multiple services processed by multiple threads on conditions that the multiple services include at least a first, a second, and a third services and the multiple threads include at least a first and a second threads, including: a communication part for supporting to deliver a service request between the multiple threads; and a processor for supporting the second thread to process the second service if the first service being processed by the first thread calls the second service, supporting the first thread to process the third service while the second service is being processed, and supporting (i) the first thread or (ii) one or more other threads except the first thread to resume a processing of an unprocessed part of the first service, by using a result value acquired by the processing of the second service if the processing of the second service is completed.

BRIEF DESCRIPTION OF THE DRAWINGS

The drawings attached below to explain example embodiments of the present invention are only part of example embodiments of the present invention and other drawings may be obtained based on the drawings provided without too much effort for those skilled in the art.

DETAILED DESCRIPTION OF THE PREFERRED EMBODIMENTS

Figure 1:
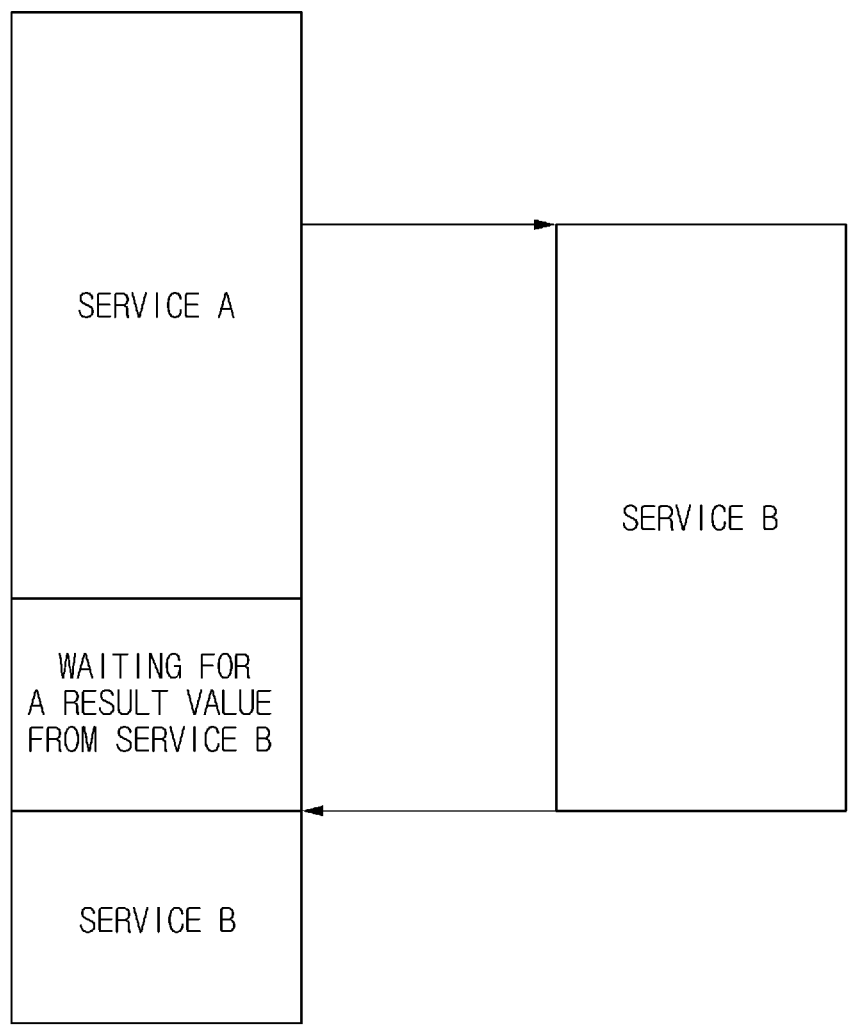
FIG. 1 is a drawing illustrating a process for calling a service under a conventional asynchronous model.

Detailed descriptions of the present invention disclosed below refer to attached/accompanied drawings that illustrate specific exemplary embodiments of the present invention that may be implemented. The exemplary embodiments are described with sufficient details in order to enable those skilled in the art to easily practice the invention. It is to be appreciated that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be appreciated that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To make those skilled in the art implement the embodiments of the present invention easily, preferred embodiments of the present invention will now be described in more detail with reference to the drawings attached/accompanied.

Figure 2:
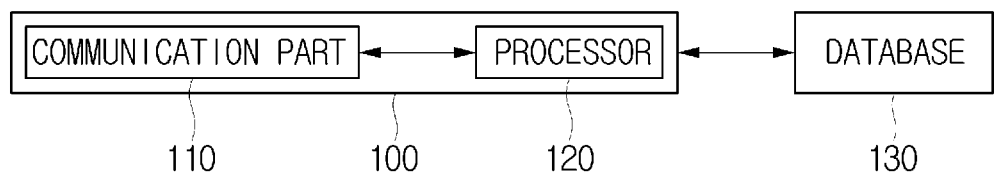
FIG. 2 is a block diagram of a computing device in accordance with one example embodiment of the present invention.

FIG. 2 is a block diagram of a computing device 100 in accordance with one example embodiment of the present invention.

First of all, as illustrated in FIG. 2, the computing device 100 in accordance with the present invention may include a communication part 110 and a processor 120. As another example, the computing device 100 may further include a database 130 as the case maybe.

Herein, the computing device 100 for managing and processing services in accordance with one example embodiment of the present invention may be a digital device and any digital devices that have processors with a computational ability, and any devices may be adopted as the computing device 100 in accordance with the present invention.

The communication part 110 may acquire a service request and distribute the service request among threads. For example, in case a specific request is made from a client, the communication part 110 may acquire the specific service request and if a processing of a first service should be completed by a first thread and if a second service is required to be processed by a second thread to complete the processing of the first service, a request for calling the second service may be delivered to the second thread.

Meanwhile, the database 130 may be accessible by the communication part 110 of the computing device 100.

In the following, a role of the processor 120 in the computing device 100 and a procedure for processing multiple services by multiple threads are to be disclosed through detailed description.

Herein, the description will be made on an assumption that the multiple services include at least a first, a second, and a third services and that the multiple threads include at least a first and a second threads.

Figure 3:
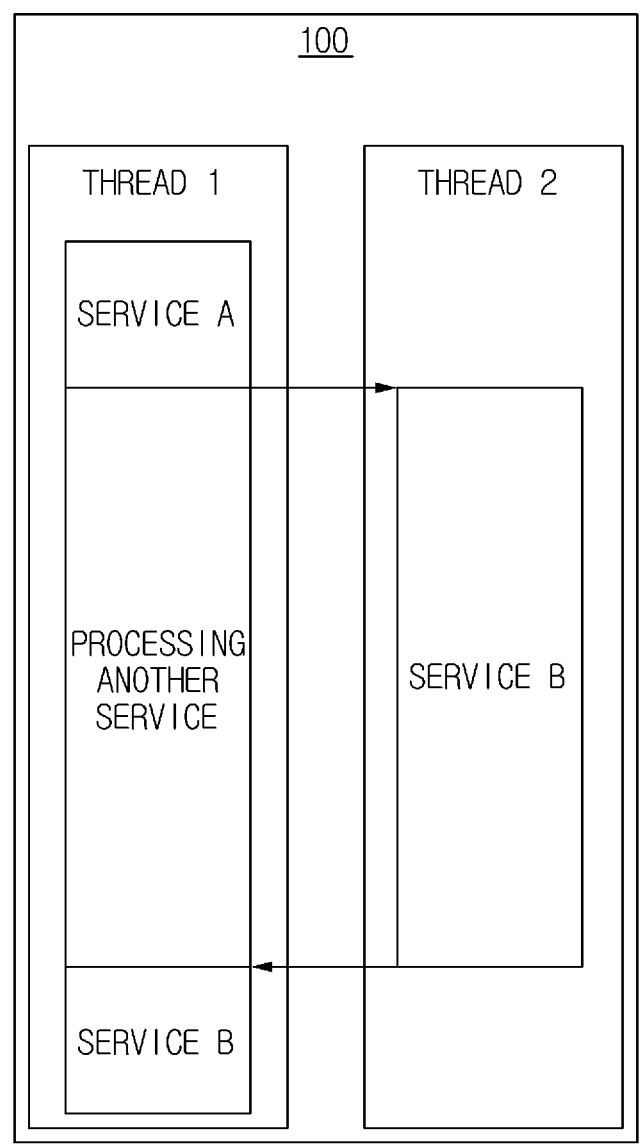
FIG. 3 is a diagram representing a process for calling a service in accordance with one example embodiment of the present invention.

FIG. 3 is a diagram representing a process for calling and processing the multiple services in accordance with one example embodiment of the present invention.

If the first service processed by the first thread needs another thread capable of processing the second service, the computing device 100 may determine the second thread as said another thread and support the second thread to process the second service.

Referring to FIG. 3, while the first thread processes a service A, i.e. the first service, the service A may call a service B, i.e. the second service, which is to be processed by the second thread.

In addition, the processing of the first service by the first thread may be suspended and information on a part of the suspended first service to be resumed afterwards may be stored in the database 130 or at least one memory.

The information on the part of the suspended first service to be resumed afterwards is necessary for the first thread or any other thread to resume the suspended first service afterwards. In detail, the information includes a piece of information on an entry-point which is a Function for processing an unprocessed part of the first service.

Specifically, a single service may include multiple Functions. With a programming model used in the present invention, one or more Functions among the multiple Functions may be set to be the entry-point. The entry-point may be viewed as or may refer to a starting point of an execution which enables business logics implemented for the respective multiple services to be executed. Thus, several Functions may be set to be the entry-point.

Generally, a fixed entry-point is used to execute each of the multiple services; however, an entry-point may be reset upon calling another service.

For example, the computing device 100 may resume a processing of the first service from the entry-point, or the Function, by executing the first service's Function which has been specified as the entry-point upon calling the second service processed by the second thread, after completing a processing of the second service.

As described above, a difference between the present invention and a prior art such as Co-routine may be ensured by the fact that the Co-routine re-executes services from a suspended point by using a call stack while the present invention designates the entry-point which is the starting point for executing an unprocessed part of a service later upon calling other service.

In general, an entry-point of a program is primarily a main Function, but in accordance with the present invention, the entry-point may be any other Function than the main Function as the case maybe because a concept of the entry-point in the present invention does not assume a case in which the first service begins to start its execution but assume a case in which the first service is suspended during its processing.

The processor 120 of the computing device 100 may acquire the entry-point from information stored in the database 130 or the memory, and may allow the first thread to resume the processing of the unprocessed part of the first service or allow another thread except for the first thread to resume the processing of the unprocessed part thereof as the case maybe, by referring to the entry-point.

A criterion for determining whether the processing of the unprocessed part of the first service is resumed by the first thread or by another thread will be explained later.

Meanwhile, while the second service is being processed by the second thread, the computing device 100 may allow the first thread to process the third service, as shown in FIG. 3.

As another example, though not illustrated in FIG. 3, if the second service is called, the first thread may process the third service after processing at least part of the first service capable of being processed regardless of information on a result value acquired by completing the processing of the second service.

In contrast, according to the conventional asynchronous model as shown in FIG. 1, while the second thread is processing the second service, the first thread may merely execute extra part of the first service but may not be able to process any other services like the third service.

As a result, according to the conventional asynchronous model, if an execution of the part of the first service capable of being processed is finished before the processing of the second service is completed, the first thread may not be able to process other services and may have to merely wait until the processing of the second service is completed. Herein, it can also be said that the conventional asynchronous model may be executed in a manner of blocking.

A difference between a conventional asynchronous model and the present invention lies in the fact that the programming model of the present invention may not be executed in the manner of blocking.

Meanwhile, if the processing of the second service is completed, the computing device 100 may resume the processing of the unprocessed part of the first service by using the information on the result value acquired by finishing the processing of the second service. Herein, the unprocessed part of the first service represents a remaining part of the first service except a partially processed part, i.e., a part of the first service having been processed.

To be specifically, if the processing of the second service is completed, the computing device 100 may deliver, to an object of the first service, the information of the result value acquired by completing the processing of the second service, and may allow the first service to be rescheduled to resume the processing thereof.

Further, the computing device 100 may allow either the first thread or one of other threads to resume the processing of the unprocessed part of the first service by using the result value acquired by finishing the processing of the second service.

If the processing of the second service is finished by the second thread before the processing of the third service is completed by the first thread, the computing device 100 may allow one of other threads except for the first thread to resume the first service. Herein, if the computing device 100 allows the second thread to resume the first service, the second thread which has processed the second service may receive from the first thread the unprocessed part of the first service and may resume the processing of the first service, instead of returning the result value acquired by finishing the processing of the second service to the first thread.

Meanwhile, if the processing of the second service is completed by the second thread while the first thread is processing the third service, the first thread may decide whether to continuously process the third service or to resume the processing of the unprocessed part of the first service.

Figure 4:
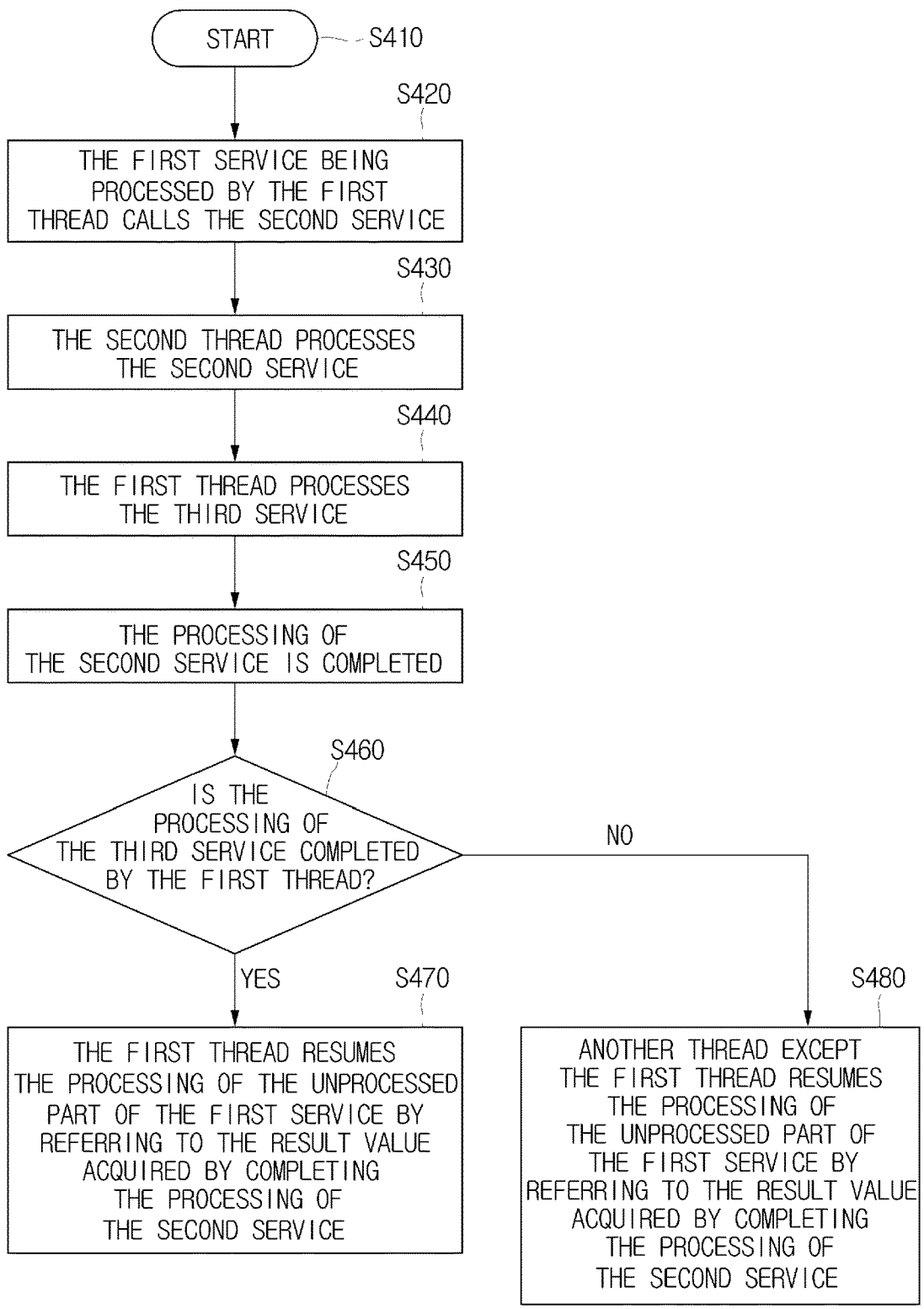
FIG. 4 is a flow chart illustrating a course of processing a first service in accordance with one example embodiment of the present invention.

FIG. 4 is a flow chart illustrating a course of processing the first service in accordance with one example embodiment of the present invention.

Referring to FIG. 4, if the first service being processed by the first thread calls the second service to be processed by the second thread as illustrated at a step of S420, the second thread processes the second service as illustrated at a step of S430 and the processing of the first service may be suspended at the first thread (not illustrated).

The first thread which suspends the processing of the first service may process the third service as illustrated at a step of S440. For a reference, when the processing of the second service is completed by the second thread as illustrated at a step of S450, whether or not the first thread has finished the processing of the third service may be detected as illustrated at a step of S460.

If the processing of the third service has been completed by the first thread, the first thread may resume the processing of the unprocessed part of the first service by using the information on the result value acquired as a result of the processing of the second service as illustrated at a step of S470.

Contrarily, if the processing of the third service has not been completed by the first thread, one of other threads except for the first thread such as the second thread or the third thread etc. may resume the processing of the unprocessed part of the first service by using the information of the result value acquired from the processing of the second service as illustrated at a step of S480.

In accordance with another example embodiment of the present invention, after the processing of the second service is completed by the second thread, (i) if the third service being processed by the first thread is expected to be completed within a preset first threshold time, the computing device 100 may support the first thread to resume the processing of the first service, and (ii) if the third service being processed by the first thread is expected not to be completed within the preset first threshold time, the computing device 100 may support one of other threads except the first thread to resume the processing of the first service.

That is, if the third service is expected to be processed by the first thread within the preset first threshold time which is not that long, the computing device 100 may support the first thread to resume the processing of the first service after the processing of the third service is completed within the first threshold time.

Contrarily, if the third service is expected not to be processed within the first threshold time, the computing device 100 may support the second thread or the third thread to resume the processing of the first service. In this case, the first thread may be processing the third service.

In accordance with still another example embodiment of the present invention, assumptions may be made on that priorities are allotted to the multiple services and the first service has a higher priority over the third service.

In this case, if the processing of the second service is completed by the second thread before the processing of the third service is completed, the computing device 100 may support the first thread to suspend the processing of the third service and resume the processing of the first service.

More specifically, since the first service has a higher priority over the third service, the computing device 100 may support the first thread to suspend the processing of the third service and to resume the processing of the unprocessed part of the first service, when the processing of the second service is completed by the second thread.

Further, after the processing of the first service is resumed by the first thread, (i) if the processing of the first service is expected to be completed within a preset second threshold time, the computing device 100 may support the first thread to process the third service.

In other words, if the unprocessed part of the first service is expected to be completed by the first thread within the preset second threshold time which is not that long, the first thread may process the third service as well after completing the processing of the first service.

Contrarily, (ii) if the processing is expected not to be completed within the preset second threshold time, the computing device 100 may support one of other threads except for the first thread to process the third service.

If the processing of the unprocessed part of the first service is expected not to be completed by the first thread within the preset second threshold time, the computing device 100 may support the first thread to process the first service and support one of other threads to process the third service.

Meanwhile, information on an estimated processing time of each of the multiple services may be stored in the database 130. Herein, the information on the estimated processing time for a service is a time expected to be spent on completing the unprocessed part of the service, and the estimated processing time may depend on a degree of complexity of one or more Functions included in the service.

The computing device 100 may select the third service to be processed by the first thread among the multiple services by referring to at least one piece of information on a processing speed of the second service in the second thread and the information on the estimated processing time acquired from the database 130 or the memory.

Specifically, if the processing speed of the second service being processed by the second thread is expected to be fast, the computing device 100 may select a service with a short processing time as the third service and then allow the first thread to process the unprocessed part of the first service by completing the processing of the third service before the processing of the second service is completed at the second thread.

Contrarily, if the processing speed of the second service being processed by the second thread is expected to be slow, even though a service with quite a long processing time is selected as the third service, the computing device 100 may support the first thread to complete the processing of the third service before the processing of the second service is completed by the second thread.

Meanwhile, the computing device 100 may store (i) information on the result value acquired by the processing of the second service or (ii) information on the partially-processed part of the first service in the database 130 or the memory in a serialized form.

In accordance with the present invention, data including a variety of variables may be readily stored and delivered to the communication part 110 if necessary by storing the information on the result value acquired by the processing of the second service or information on the partially-processed part of the first service in the serialized form.

To be specifically, since the object which has processed the first service is stored in the memory or the database 130 in the serialized form, it may be possible to directly use the information on the partially-processed part of the first service at the time when the processing of the first service is to be resumed after the processing of the second service is completed.

Certainly, data such as the variables mentioned above may be stored not only in the serialized form but also be simply stored as a reference in the memory.

Finally, the present invention aims at achieving the following effects:

The present invention has an effect of increasing throughputs of services processed by threads by allowing the first thread to process another service before the callee service is completed by the second thread.

The present invention also has an effect of ensuring all services to be processed effectively under a circumstance that the first service being processed by the first thread calls the second service to be processed by the second thread and then, if the second service is completely processed by the second thread while another service is being processed by the first thread, the first service which has been suspended due to the call of the first service is allowed to be resumed by another thread.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be appreciated by those skilled in the art that various changes and modifications may be made without departing from the spirit and the scope of the invention as defined in the following claims.

Accordingly, the thought of the present invention must not be confined to the described embodiments, and the following claims as well as anything including variants equal to or equivalent to the claims pertain to the category of the thought of the present invention.

What is claimed is:

1. A method for increasing throughputs of multiple services processed by multiple threads on conditions that the multiple services include at least a first, a second, and a third services and the multiple threads include at least a first and a second thread, comprising steps of:
    (a) a computing device, if the first service being processed by the first thread calls the second service, supporting the second thread to process the second service; and
    (b) the computing device, while the second service is being processed, supporting the first thread to process the third service; and
    (c) the computing device, proceeding with either a first option or a second option depending on whether a circumstance meets a first condition or a second condition,
    wherein, according to the first option, the computing device supports the first thread to resume the processing of the first service after the second service is completed by the second thread if the circumstance meets the first condition which includes either (i) a condition that the processing of the second service is completed by the second thread after the processing of the third service is completed, or (ii) a condition that the third service being completed by the first thread is expected to be processed within a preset first threshold time,
    and wherein, according to the second option, the computing device supports said other threads except the first thread to resume the processing of the first service if the circumstance meets the second condition that the third service being processed by the first thread is expected not to be completed within the preset first threshold time.

2. The method of claim 1, wherein, on conditions that priorities are allotted to the multiple services and the first service has a higher priority over the third service, if the processing of the second service is completed by the second thread before the processing of the third service is completed, the computing device supports the first thread to suspend the processing of the third service and to resume the processing of the first service.

3. The method of claim 2, wherein, after the processing of the first service has been resumed by the first thread, (i) if the processing is expected to be completed within a preset second threshold time, the computing device supports the first thread to process the third service, and (ii) if the processing is expected not to be completed within the preset second threshold time, the computing device supports said other threads except the first thread to process the third service.

4. The method of claim 1, wherein, at the step of (a), if the first service being processed by the first thread calls the second service, the computing device suspends the processing of the first service and stores information on a part of the suspended first service to be resumed in a database or a memory.

5. The method of claim 4, wherein, at the step of (c), on condition that a Function as an entry-point capable of processing the unprocessed part of the first service is included in the information on the part of the suspended first service to be resumed, if the part of the first service is being processed, the computing device supports said other threads except the first thread to process the unprocessed part of the first service by referring to the entry-point acquired from the database or the memory.

6. The method of claim 1, wherein, on condition that information on an estimated processing time of each service is stored in a database or a memory, at the step of (b), the computing device selects the third service among the multiple services by referring to at least one piece of information on a processing speed of the second service in the second thread and the information on the estimated processing time acquired from the database or the memory.

7. The method of claim 1, wherein the computing device stores (i) the result value acquired by the processing of the second service or (ii) information on a partially-processed part of the first service in a database or a memory in a serialized form, wherein the partially-processed part of the first service represents a part except the unprocessed part thereof.

8. A computing device for increasing throughputs of multiple services processed by multiple threads on conditions that the multiple services include at least a first, a second, and a third services and the multiple threads include at least a first and a second threads, comprising:

a communication part for supporting to deliver a service request between the multiple threads; and a processor for supporting the second thread to process the second service if the first service being processed by the first thread calls the second service, supporting the first thread to process the third service while the second service is being processed, and supporting the execution of either a first option or a second option depending on whether a circumstance meets a first condition or a second condition, wherein, according to the first option, the processor supports the first thread to resume the processing of the first service after the second service is completed by the second thread if the circumstance meets the first condition which includes either (i) a condition that the processing of the second service is completed by the second thread after the processing of the third service is completed, or (ii) a condition that the third service being completed by the first thread is expected to be processed within a preset first threshold time, and wherein, according to the second option, the processor supports said other threads except the first thread to resume the processing of the first service if the circumstance meets the second condition that the third service being processed by the first thread is expected not to be completed within the preset first threshold time.

9. The computing device of claim 8, wherein, on conditions that priorities are allotted to the multiple services and the first service has a higher priority over the third service, if the processing of the second service is completed by the second thread before the processing of the third service is completed, the computing device supports the first thread to suspend the processing of the third service and to resume the processing of the first service.

10. The computing device of claim 9, wherein, after the processing of the first service has been resumed by the first thread, (i) if the processing is expected to be completed within a preset second threshold time, the computing device supports the first thread to process the third service, and (ii) if the processing is expected not to be completed within the preset second threshold time, the computing device supports said other threads except the first thread to process the third service.

11. The computing device of claim 8, wherein, if the first service being processed by the first thread calls the second service, the computing device suspends the processing of the first service and stores information on the a part of the suspended first service to be resumed in a database or a memory.

12. The computing device of claim 11, wherein, on condition that a Function as an entry-point capable of processing the unprocessed part of the first service is included in the information on the part of the suspended first service to be resumed, if the unprocessed part of the first service is being processed, the computing device supports said other threads except the first thread to resume the processing of the unprocessed part of the first service by referring to the entry-point acquired from the database or the memory.

13. The computing device of claim 8, wherein, on condition that information on an estimated processing time of each service is stored in a database or a memory, the computing device selects the third service among the multiple services by referring to at least one piece of information on a processing speed of the second service in the second thread and the information on the estimated processing time acquired from the database or the memory.

14. The computing device of claim 8, wherein the computing device stores (i) the result value acquired by the processing of the second service or (ii) information on a partially-processed part of the first service in a database or a memory in a serialized form, wherein the partially-processed part of the first service represents a part except the unprocessed part thereof.

* * * * *